J. W. LAWRENCE.
Refrigerator.
No. 206,028. Patented July 16, 1878.
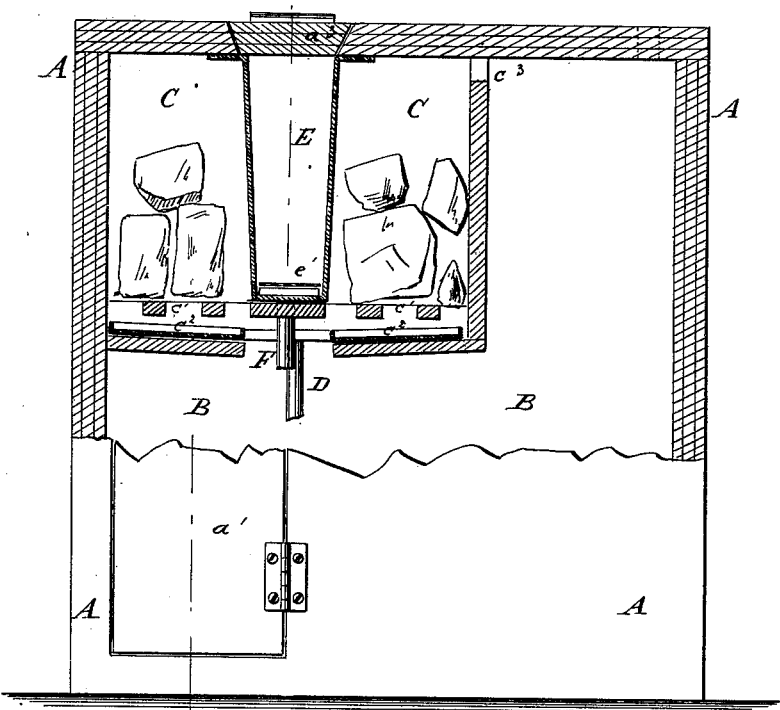
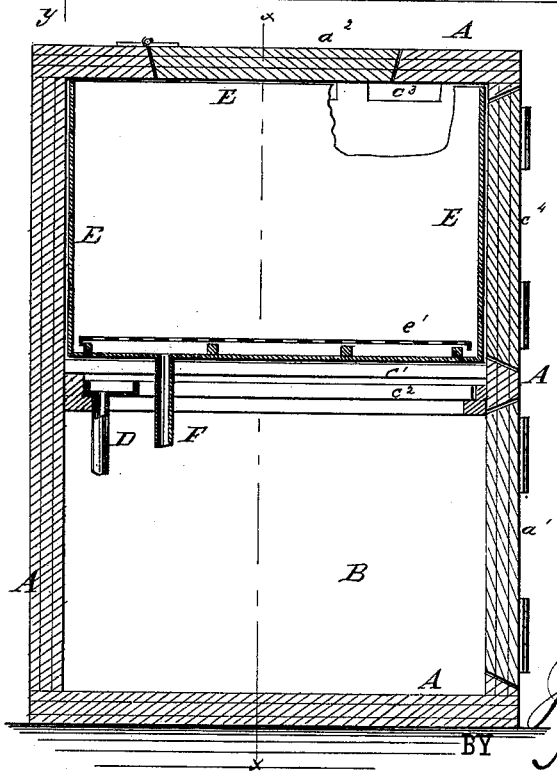
WITNESSES:
INVENTOR:
J. W. Lawrence
BY
ATTORNEYS.

UNITED STATES PATENT OFFICE.

JAMES W. LAWRENCE, OF NEW YORK, N. Y., ASSIGNOR TO WALTER S. LAWRENCE, OF SAME PLACE.

IMPROVEMENT IN REFRIGERATORS.

Specification forming part of Letters Patent No. 206,028, dated July 16, 1878; application filed May 14, 1878.

*To all whom it may concern:*

Be it known that I, JAMES W. LAWRENCE, of the city, county, and State of New York, have invented a new and useful Improvement in Ice-Houses, of which the following is a specification:

In the accompanying drawings, forming part hereof, Figure 1 is a front view of an ice-house to which my improvement has been applied, partly in vertical section, through the line $xx$, Fig. 2; and Fig. 2 is a section of the same, taken through the line $yy$, Fig. 1.

Similar letters of reference indicate corresponding parts.

The object of this invention is to furnish ice-houses for the use of butchers, provision-dealers, and others, which shall be so constructed as to produce a colder temperature than is possible to be produced with ice alone, and which at the same time will prevent the ice in the bunker or ice-chamber from melting.

A represents an ice-house constructed in the usual way, and in the lower part of which is formed the provision-chamber B, access being had to the said chamber through a door or doors, $a^1$, in the usual way.

In the upper part of the ice-house A is formed the ice-chamber C, in the bottom of which are placed racks $c^1$ to support the ice and pans $c^2$ to receive the water as the ice melts. The waste water from the ice-chamber escapes from the ice-house through a waste-pipe, D.

In the middle part of the floor of the ice-chamber C is formed an opening, through which the cold air from the said ice-chamber passes down into the provision-chamber B, the heated air from the provision-chamber B passing up at the side of the ice-chamber C, and entering the said ice-chamber through openings $c^3$ in its upper part. Access is had to the ice-chamber C, for the insertion and removal of the ice, through doors $c^4$ in its front or top, as may be desired or convenient.

In the ice-chamber C is placed a chamber, E, of zinc or other non-corroding material, which is provided with a grate or perforated false bottom, $e^1$, and with a pipe, F, to carry off the melted ice. Access is had to the chamber E through a door, $a^2$, in the top of the ice-house A. The chamber E is made air-tight, so that there may be no communication between the interior of the said chamber and the chambers C and B of the ice-house.

In using the ice-house, the chamber E is supplied with broken ice and salt in proper proportions, the action of which produces an intense cold in the ice-chamber C. Cold air passes down into the provision-chamber B, the warm air from said chamber rising and entering the upper part of the ice-chamber C, to be in turn cooled, so that the provision-chamber will be kept at a lower temperature than is possible with ice alone. The refrigerating-chamber E should be supplied with ice and salt once a day or oftener, or not so often, as may be required.

With this construction the temperature of the ice-chamber C will be kept so low that there will be little or no melting of the ice in said chamber, the refrigerating-chamber being relied upon for producing the required temperature.

Having thus described my invention, I claim as new, and desire to secure by Letters Patent—

The combination, in a refrigerator having elevated ice-chamber C in the provision-chamber B, of the salt and ice chamber E, made air-tight, and placed inside the ice-chamber, as and for the purpose specified.

JAMES W. LAWRENCE.

Witnesses:
C. SEDGWICK,
ALEX. F. ROBERTS.